Figure 1:
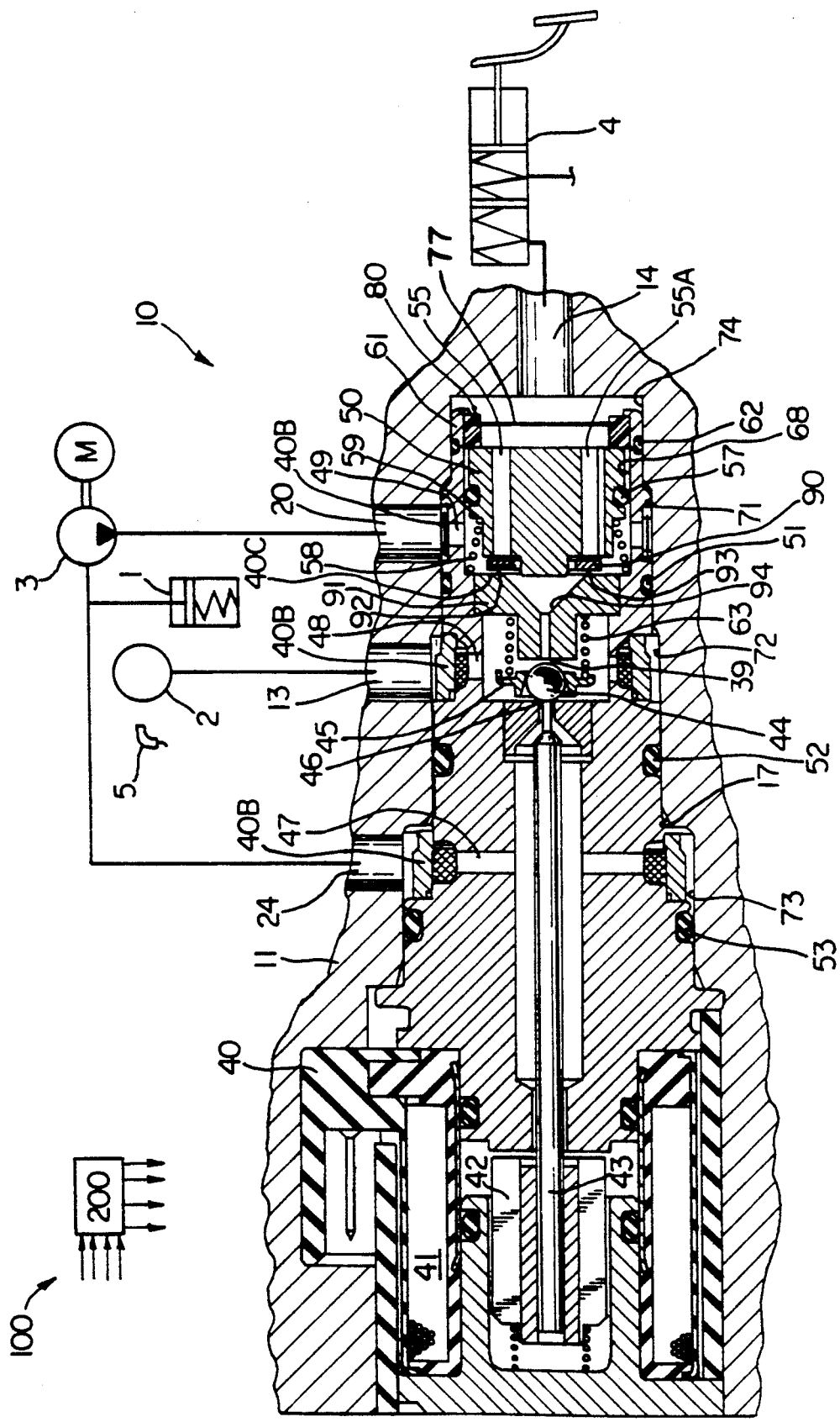

United States Patent
Rizk

[11] Patent Number: 5,163,474
[45] Date of Patent: Nov. 17, 1992

[54] COMBINATION SOLENOID VALVE AND INTEGRAL SHUTTLE VALVE

[75] Inventor: Gamil M. Rizk, South Bend, Ind.

[73] Assignee: Allied-Signal Inc., Morristown, N.J.

[21] Appl. No.: 792,823

[22] Filed: Nov. 15, 1991

[51] Int. Cl.⁵ ............................................ F15B 13/044
[52] U.S. Cl. ......................... 137/596.17; 303/119 SV; 303/119.2
[58] Field of Search ............. 137/596.17; 303/119 SV

[56] References Cited

U.S. PATENT DOCUMENTS

| | | | |
|---|---|---|---|
| 4,620,565 | 11/1986 | Brown | 137/596.17 |
| 4,844,119 | 7/1989 | Martinic | 137/596.17 |
| 4,936,344 | 6/1990 | Gilbert et al. | 137/596.17 |
| 4,938,545 | 7/1990 | Shuey et al. | 137/596.17 X |
| 4,972,873 | 11/1990 | Fulmer et al. | 137/87 X |
| 5,005,919 | 4/1991 | Shuey et al. | 137/596.17 X |

Primary Examiner—Gerald A. Michalsky
Attorney, Agent, or Firm—Larry J. Palguta; Ken C. Decker

[57] ABSTRACT

The combination solenoid valve and integral shuttle shuttle valve (10) comprises a solenoid valve (40) having windings (41) which actuate a rod (43) that engages a ball valve (44). An end (61) of the solenoid valve (63) includes an end filter mount (80) having a filter (77) and engaged by a shuttle valve (50). Located sealingly and slidably within the end (61) of the solenoid valve (41) is the shuttle valve (50) which is biased away from the ball valve (44) by a spring (58). The shuttle valve (50) has at least one through opening (55, 55A) which is aligned with a movable orificed washer (90) located about an extension (54) of the shuttle valve (50). An end section (74) of the bore (17) adjacent the end (61) of the solenoid valve (40) includes a master cylinder passage (14), a first bore section (71) includes a pressure source passage (20) and communicates with lateral openings (49) in the end (61) of the solenoid valve (40), a second bore (72) section communicates with a wheel brake passage (13) and with lateral openings (48) in the solenoid valve (40), and a third bore section (73) communicates with a sump passage (24) that is aligned with lateral openings (47) in the solenoid valve (40). During operation of the solenoid valve (40), the shuttle valve (50) can slide and displace the washer (90) into engagement with a body member (91) of the solenoid valve (40) and cause pressurized fluid from the master cylinder passage (14) and pressure source passage (20) to communicate through an orifice (92) of the washer (90).

14 Claims, 1 Drawing Sheet

COMBINATION SOLENOID VALVE AND INTEGRAL SHUTTLE VALVE

The present invention relates generally to a combination solenoid valve and integral shuttle valve, and in particular to an electrically operated valve mechanism for an adaptive braking system.

Numerous adaptive braking systems have been proposed previously. Adaptive braking systems can typically include numerous solenoid valves, check valves, flow restrictions, shuttle valves, and various types of pressure source mechanisms. Fulmer et al U.S. Pat. No. 4,972,873 illustrates a shuttle valve which includes a floating orificed washer. In adaptive braking systems which utilize solenoid valves and shuttle valves, it is highly desirable to combine structurally a solenoid valve with its respective shuttle valve. Combined solenoid valve and shuttle valve structures are disclosed in U.S. Pat. Nos. 4,620,565; 4,844,119; and 4,936,344. The combined structure has the potential for greatly simplifying the number and complexity of plumbing connections, and substantially reducing the cost of the entire system. It is desirable to provide a combination solenoid valve and integral shuttle valve structure which can be easily assembled and which provides a complexity of functions that significantly exceeds the functions illustrated in Brown U.S. Pat. No. 4,620,565, Martinic U.S. Pat. No. 4,844,119 and Gilbert et al U.S. Pat. No. 4,936,344. The complexity of functions that are desired may comprise the equivalent of numerous check valves, flow restrictions, fluid pressure connections, and springs utilized in the check valve structures.

The present invention provides solutions to the above problems by providing a combination solenoid valve and integral shuttle valve, comprising a body having therein a bore comprising a first bore section, a second bore section, and a third bore section sealingly isolated from one another at the perimeter of the bore, the solenoid valve located within the bore and operable to open a valve therein in order to communicate said second bore section with said third bore section, and the shuttle valve disposed sealingly and slidably within an end of said solenoid valve and adjacent the first bore section, the shuttle valve having at least one through opening permitting fluid flow between the end of the solenoid valve and the valve of the solenoid valve, a movable orifice member located between the valve of the solenoid valve and the shuttle valve, and a pressure source opening in the solenoid valve for communicating pressurized fluid with the valve of the solenoid valve, the shuttle valve slidable to cooperate with the movable orifice member and solenoid valve in order to limit fluid flow from said through opening and pressure source opening to said valve of the solenoid valve.

The invention is described in detail below with reference to the drawings which illustrate an embodiment in which:

FIG. 1 is a section view of the combination solenoid valve and integral shuttle valve in accordance with the present invention.

The combination solenoid valve and integral shuttle valve of the present invention is designated generally by reference numeral 10 in FIG. 1. Solenoid valve and shuttle valve 10 includes decay solenoid valve 40 and shuttle valve 50. Body 11, such as a modulator body, includes therein stepped bore 17 which comprises first bore section 71, second bore section 72 and third bore section 73. Solenoid valve 40 includes windings 41 disposed about armature 42 connected with solenoid actuating rod 43 that engages ball valve 44. Ball valve 44 is also biased by spring 63 biased ball washer 45 so that, at rest, ball valve 44 engages valve seat 46 and valve seat 39 is open. Seat 39 is at the end of opening 94 of body member 91. Solenoid valve 40 includes lateral openings 47, 48 and 49 which connect respectively with passage 24 communicating with a sump 1 for an adaptive braking system 100, passage 13 which communicates with a wheel brake 2, and passage 20 which communicates with a pressure source or pump 3. Located about each opening 47, 48 and 49 is filter 40B. Solenoid valve 40 and stepped bore 17 define with seals 62 and 51 the first bore section 71, with seals 51 and 52 the second bore section 72, and with seals 52 and 53 the third bore section 73. End bore section 74 is disposed adjacent end 61 of solenoid valve 40. End 61 of solenoid valve 40 is located adjacent passage 14 which communicates with a pressure generator such as a master cylinder 4. Shuttle valve 50 includes at least one and preferably a plurality of through openings 55 which provide for fluid communication between passage 14/end 61 and ball valve 44. Opening 55A has a slightly larger diameter so that during a release phase of braking fluid can flow through the opening to passage 14 without being blocked by a washer 90. Spring 58 is disposed between shoulder 40C of solenoid body member 91 and shoulder 59 of the shuttle valve in order to bias the shuttle valve into engagement with end filter mount 80. Seal 57 disposed about shuttle valve 50 sealingly engages surface 68 of the interior of end 61.

Located about shuttle valve extension 54 is movable orifice member or floating orificed washer 90 which is aligned with through openings 55, 55A of shuttle valve 50. Orifice 92 extends laterally or radially across washer 90 such that it is disposed in washer face 93 which faces toward ball valve 44. Washer 90 is captured between solenoid body member 91 (which provides valve seat 39) and shuttle valve 50.

During normal braking, fluid pressure is generated in the master cylinder 4 and transmitted via passage 14 to end bore section 74 where it passes freely through filter 77, through openings 55, 55A, past open valve seat 39 and out lateral openings 48 to passage 13 connecting with wheel brake 2. Shuttle valve 50 is not displaced or moved to a stroked position because of the biasing effect of spring 58 which retains the shuttle valve in the illustrated at-rest position. When an imminent wheel skid is sensed by a wheel speed sensor 5 and an ECU 200 of adaptive braking system 100, the ECU activates solenoid valve 40 which displaces actuating rod 43 against ball valve 44 so that fluid pressure at the not shown wheel brake decays past open valve seat 46, through openings 47 and to passage 24 which communicates with a sump 1 and an inlet side of the pump 3. At the same time, the pump is activated to provide increased fluid pressure via passage 20 communicating with the solenoid valve at first bore section 71 and lateral openings 49. Because the shuttle valve senses the decayed or reduced fluid pressure on the side of the shuttle valve adjacent ball valve 44 while receiving high pressure fluid from the master cylinder via passage 14, the shuttle valve will overcome the biasing force of spring 58 and move to a displaced or stroked position wherein shuttle valve 50 engages washer 90 such that washer 90 blocks fluid flow through the shuttle valve and into opening 94 and the master cylinder is substantially isolated from passage 13 communicating with the wheel brake 2. Although the shuttle valve senses increased fluid pressure from the pump via line 20, this increased pressure flows through orifice 92, opening 94, and past valve seat 39. When the decay mode is terminated, ball valve 44 approaches or reseats upon valve seat 46 as actuating rod 43 retracts. During a build mode, fluid pressure from passage 20 proceeds through orifice 92 of washer 90 and opening 94 of body member 91, past open valve seat 39 and to passage 13 for communication with the wheel brake. Shuttle valve 50 will stay in the translated or stroked position during the entire antilock braking system cycle. As solenoid valve 40 operates, actuating rod 43 modulates ball valve 44 to simultaneously reduce the amount of pump generated brake fluid pressure being transmitted to the wheel brake 2 via valve seat 39 and passage 13 and effect the decay of brake fluid pressure from the brake toward passage 24 via valve seat 46 and lateral openings 47. During post antilock braking system operation and the release phase of braking, fluid pressure at the master cylinder 4 and passage 14 will typically be less than the fluid pressure at passage 13 and the wheel brake. Shuttle valve 50 will move back to the at-rest position illustrated in FIG. 1 so that fluid pressure at passage 13 (and the wheel brake) will return past open valve seat 39, through opening 94 and around washer 90, through openings 55 and 55A or just 55A if washer 90 blocks opening 55, and past solenoid valve end 61 to passage 14 communicating with the master cylinder.

The combination solenoid valve and integral shuttle valve disclosed herein provides a compact unitary component which may be easily inserted within a bore of an adaptive braking system modulator. The shuttle valve is located entirely within an end of the body of the solenoid valve, so that the entire unit may be simply inserted into the bore of the modulator body. After a minimal amount of assembly required for retaining the combination valve in the bore, the modulator is then fully operational.

I claim:

1. A combination solenoid valve and integral shuttle valve, comprising a body having therein a bore comprising a first bore section, a second bore section, and a third bore section sealingly isolated from one another at the perimeter of the bore, the solenoid valve located within the bore and operable to open a value therein in order to communicate said second bore section with said third bore section, the shuttle valve disposed sealingly and slidably within an end of said solenoid valve and adjacent the first bore section, the shuttle valve having at least one through opening permitting fluid flow between the end of the solenoid valve and the valve of the solenoid valve, a movable orifice member located between the valve of the solenoid valve and the shuttle valve, the movable orifice member aligned with the through opening so that when the shuttle valve is displaced by fluid pressure received at the end of the shuttle valve the orifice member is captured between the shuttle valve and solenoid valve and fluid flow to the valve of the solenoid valve is through an orifice of the movable orifice member, and a pressure source opening in the solenoid valve for communicating pressurized fluid with the valve of the solenoid valve, the shuttle valve slidably displaceable by fluid pressure received from a master cylinder passage to engage the movable orifice member and cause pressurized fluid from the pressure source opening to be transmitted through the orifice of the movable member and to the valve of the solenoid valve.

2. The combination solenoid valve and integral shuttle valve in accordance with claim 1, wherein the movable orifice member comprises a washer having a laterally extending orifice disposed on a side of the washer facing the valve of the solenoid valve.

3. The combination solenoid valve and integral shuttle valve in accordance with claim 2, wherein the through opening has a diameter larger than an aligned portion of the movable orifice member so that the movable orifice member does not block fluid flow into the through opening and toward the end of the solenoid valve.

4. The combination solenoid valve and integral shuttle valve in accordance with claim 3, wherein the valve of the solenoid valve comprises a ball valve engaged on one side by a spring biased ball washer and on the other side by an actuating rod of the solenoid valve.

5. The combination solenoid valve and integral shuttle valve in accordance with claim 1, wherein the first bore section includes a pressure source passage, the second bore section includes a wheel brake passage, and the third bore section includes a sump means passage.

6. The combination solenoid valve and integral shuttle valve in accordance with claim 1, further comprising resilient means disposed between the shuttle valve and the solenoid valve so that the shuttle valve is biased away from the valve of the solenoid valve and into engagement with a portion of the end of the solenoid valve.

7. The combination solenoid valve and integral shuttle valve in accordance with claim 6, further comprising another through opening in the shuttle valve and aligned with a portion of the movable orifice member.

8. The combination solenoid valve and integral shuttle valve in accordance with claim 7, wherein the portion of the end of the solenoid valve includes a filter for fluid flow.

9. A combination solenoid valve and integral shuttle valve, comprising a body having therein a bore comprising a first bore section, a second bore section, and a third bore section sealingly isolated from one another at the perimeter of the bore, the solenoid valve located within the bore and operable to open a valve therein in order to communicate said second bore section with said third bore section, the shuttle valve disposed sealingly and slidably within an end of said solenoid valve and adjacent the first bore section, the shuttle valve having at least one through opening permitting fluid flow between the end of the solenoid valve and the valve of the solenoid valve, a movable orifice member located between the valve of the solenoid valve and the shuttle valve, the movable orifice member aligned with the through opening so that when the shuttle valve is displaced by fluid fluid received at the end of the shuttle valve and solenoid valve and fluid flow to the valve of the solenoid valve is through an orifice of the movable orifice member, and a pressure source opening in the solenoid valve for communicating pressurized fluid with the valve of the solenoid valve, the shuttle valve displaceable by fluid pressure received at the end of the solenoid valve to cause the movable orifice member to engage the solenoid valve and limit fluid flow from said pressure source opening to said valve of the solenoid valve, wherein the movable orifice member comprises a washer and the orifice is a laterally extending orifice disposed on a side of the washer facing the valve of the solenoid valve.

10. The combination solenoid valve and integral shuttle valve in accordance with claim 9, wherein the through opening has a diameter larger than an aligned portion of the movable orifice member so that the movable orifice member does not block fluid flow into the through opening and toward the end of the solenoid valve.

11. The combination solenoid valve and integral shuttle valve in accordance with claim 10, wherein the valve of the solenoid valve comprises a ball valve engaged on one side by a spring biased ball washer and on the other side by an actuating rod of the solenoid valve.

12. The combination solenoid valve and integral shuttle valve in accordance with claim 11, wherein and end of the bore includes a master cylinder passage, the first bore section includes a pressure source passage, the second bore section includes a wheel brake passage, and the third bore section includes a sump means passage.

13. A combination solenoid valve and integral shuttle valve, comprising a body having therein a bore comprising a first bore section, a second bore section, and a third bore section sealingly isolated from one another at the perimeter of the bore, the solenoid valve located within the bore and operable to open a valve therein in order to communicate said second bore section with said third bore section, the shuttle valve disposed sealingly and slidably within an end of said solenoid valve and adjacent the first bore section, the shuttle valve having at least one through opening permitting fluid flow between the end of the solenoid valve and the valve of the solenoid valve, a movable orifice member located between the valve of the solenoid valve and the shuttle valve, the movable orifice member aligned with the through opening so that when the shuttle valve is displaced by fluid pressure received at the end of the shuttle valve the orifice member is captured between the shuttle valve and solenoid valve and fluid flow to the valve of the solenoid valve is through an orifice of the movable orifice member, and a pressure source opening in the solenoid valve for communicating pressurized fluid with the valve of the solenoid valve, the shuttle valve displaceable by fluid pressure received at the end of the solenoid valve to cause the movable orifice member to engage the solenoid valve and limit fluid flow from said pressure source opening to said valve of the solenoid valve, and further comprising resilient means disposed between the shuttle valve and the solenoid valve so that the shuttle valve is biased away from the valve of the solenoid valve and into engagement with a portion of the end of the solenoid valve, and another through opening located in the shuttle valve and aligned with a portion of the movable orifice member.

14. The combination solenoid valve and integral shuttle valve in accordance with claim 13, wherein the portion of the end of the solenoid valve includes a filter for fluid flow.

* * * * *